US012223968B2

(12) United States Patent
Villemoes et al.

(10) Patent No.: US 12,223,968 B2
(45) Date of Patent: Feb. 11, 2025

(54) MULTI-LAG FORMAT FOR AUDIO CODING

(71) Applicant: Dolby International AB, Amsterdam Zuidoost (NL)

(72) Inventors: Lars Villemoes, Järfälla (SE); Heidi-Maria Lehtonen, Sollentuna (SE); Heiko Purnhagen, Sundbyberg (SE); Per Hedelin, Gothenburg (SE)

(73) Assignee: Dolby International AB, Amsterdam Zuidoost (NL)

( * ) Notice: Subject to any disclaimer, the term of this patent is extended or adjusted under 35 U.S.C. 154(b) by 321 days.

(21) Appl. No.: 17/636,856

(22) PCT Filed: Aug. 18, 2020

(86) PCT No.: PCT/EP2020/073067

§ 371 (c)(1),
(2) Date: Feb. 18, 2022

(87) PCT Pub. No.: WO2021/032719

PCT Pub. Date: Feb. 25, 2021

(65) Prior Publication Data

US 2022/0277754 A1 Sep. 1, 2022

Related U.S. Application Data

(60) Provisional application No. 62/889,118, filed on Aug. 20, 2019.

(30) Foreign Application Priority Data

Aug. 20, 2019 (EP) .................................... 19192552

(51) Int. Cl.
*G10L 19/02* (2013.01)
*G10L 19/24* (2013.01)
(Continued)

(52) U.S. Cl.
CPC .......... *G10L 19/0204* (2013.01); *G10L 19/24* (2013.01); *G10L 25/06* (2013.01); *G10L 25/18* (2013.01)

(58) Field of Classification Search
CPC ............................ G10L 19/0204; G10L 19/24
See application file for complete search history.

(56) References Cited

U.S. PATENT DOCUMENTS 6,377,915 B1 4/2002 Sasaki
6,996,523 B1 2/2006 Bhaskar
(Continued)

FOREIGN PATENT DOCUMENTS

CN 101542599 A 9/2009
CN 103532901 A 1/2014
(Continued)

OTHER PUBLICATIONS

Feldbauer, C., Kubin, G. & Kleijn, W.B. "Anthropomorphic Coding of Speech and Audio: A Model Inversion Approach", EURASIP J. Adv. Signal Process. 2005.
(Continued)

*Primary Examiner* — Paras D Shah

(57) ABSTRACT

Described herein is a method of encoding an audio signal. The method comprises: generating a plurality of subband audio signals based on the audio signal; determining a spectral envelope of the audio signal; for each subband audio signal, determining autocorrelation information for the subband audio signal based on an autocorrelation function of the subband audio signal; and generating an encoded representation of the audio signal, the encoded representation comprising a representation of the spectral envelope of the audio signal and a representation of the autocorrelation information for the plurality of subband audio signals. Further described are methods of decoding the audio signal from the encoded representation, as well as corresponding
(Continued)

encoders, decoders, computer programs, and computer-readable recording media.

18 Claims, 8 Drawing Sheets

(51) Int. Cl.
*G10L 25/06* (2013.01)
*G10L 25/18* (2013.01)

(56) References Cited

U.S. PATENT DOCUMENTS

| | | | | |
|---|---|---|---|---|
| 2006/0080088 | A1* | 4/2006 | Lee | G10L 25/90 704/207 |
| 2007/0282600 | A1 | 12/2007 | Ojanpera | |
| 2008/0046233 | A1 | 2/2008 | Chen | |
| 2008/0300702 | A1 | 12/2008 | Gomez | |
| 2009/0326931 | A1 | 12/2009 | Ragot | |
| 2010/0017204 | A1 | 1/2010 | Oshikiri | |
| 2011/0270616 | A1 | 11/2011 | Garudadri | |
| 2017/0069328 | A1 | 3/2017 | Kawashima | |
| 2017/0076728 | A1 | 3/2017 | Kawashima | |
| 2018/0144751 | A1 | 5/2018 | Purnhagen | |
| 2018/0158466 | A1* | 6/2018 | Kawashima | G10L 19/265 |
| 2019/0156845 | A1 | 5/2019 | Nagel | |
| 2019/0393903 | A1* | 12/2019 | Mandt | H03M 7/30 |

FOREIGN PATENT DOCUMENTS

| | | | | |
|---|---|---|---|---|
| CN | 106847295 A | | 6/2017 | |
| EP | 1121686 B1 | * | 1/2004 | G10L 19/0212 |
| IN | 201838017784 A | | 6/2018 | |
| JP | 2000267700 A | | 9/2000 | |
| JP | 2001051698 A | | 2/2001 | |
| JP | 2004289196 A | | 10/2004 | |
| JP | 2006235643 A | | 9/2006 | |
| JP | 2009501351 A | | 1/2009 | |
| JP | 2018528464 A | | 9/2018 | |
| WO | 2019083055 A1 | | 5/2019 | |

OTHER PUBLICATIONS

Heikkinen A: "Development of A 4 KBPS Hybrid Sinusoidal/Celp Speech Coder", These De Doctorat Presentee Au Departement De Chimie De L'Universite De Lausanne Pour L'Obtention Du Grade De Docteur Es Sciences .. Jun. 28, 2002 (Jun. 28, 2002), pp. 1-166.

J. H. McDermott, A. J. Oxenham and E. P. Simoncelli, "Sound texture synthesis via filter statistics," 2009 IEEE Workshop on Applications of Signal Processing to Audio and Acoustics, New Paltz, NY, 2009, pp. 297-300.

J. Klejsa, P. Hedelin, C. Zhou, R. Fejgin and L. Villemoes, "High-quality Speech Coding with Sample RNN," ICASSP 2019—2019 IEEE International Conference on Acoustics, Speech and Signal Processing (ICASSP), Brighton, United Kingdom, 2019, pp. 7155-7159.

Laflamme C et al: "Harmonic-stochastic excitation (HSX) speech coding below 4 kbit/s", 1996 IEEE International Conference On Acoustics, Speech, and Signal Processing—Proceedings. (ICASSP). Atlanta, May 7 10, 1996; [IEEE International Conference On Acoustics,—Speech, and Signal Processing Proceedings. (ICASSP)], New York, vol. 1. May 7, 1996 (May 7, 1996), pp. 204-207.

Thiemann, Joachim. (2011). "A Sparse Auditory Envelope Representation with Iterative Reconstruction for Audio Coding". PHD Thesis, McGill Univ.

Laurent Pa et al: "A robust 2400 bps subband LPC vocoder", 1995 International Conference On Acoustics, Speech, and Signal Processing; May 9-12, 1995 ; Detroit, MI, USA, IEEE, New York, NY, USA, vol. 1, May 9, 1995 (May 9, 1995), pp. 500-503.

M. Slaney, "Pattern playback from 1950 to 1995," 1995 IEEE International Conference on Systems, Man and Cybernetics. Intelligent Systems for the 21st Century, Vancouver, BC, Canada, 1995, pp. 3519-3524 vol.4.

Per Hedelin "A sinusoidal LPC vocoder" in 2000 IEEE Workshop on Speech Coding. Proceedings. Meeting the Challenges of the New Millennium (Cat. No.00EX421), Sep. 2000, pp. 2-4.

Prockup, Matthew K. "A Data-Driven Exploration of Rhythmic Attributes and Style in Music" Office of Graduate Studies, Dissertation/Thesis Approval Form, Mar. 2016.

T. Nanjundaswamy and K. Rose, "Cascaded long term prediction for coding polyphonic audio signals," 2011 IEEE Workshop on Applications of Signal Processing to Audio and Acoustics (WASPAA), New Paltz, NY, 2011, pp. 21-24.

Nie Wei, et al. "Implementation of OFDM synchronization algorithm based on modified-AMDF", Computer System and Communication Laboratory, Beijing University, of Chemical Technology, Beijing, 100029, China, Nov. 20, 2010, 5 Pages.

* cited by examiner

MULTI-LAG FORMAT FOR AUDIO CODING

CROSS-REFERENCE TO RELATED APPLICATIONS

This application claims priority of the following priority applications: U.S. provisional application 62/889,118 (reference: D19076USP1), filed 20 Aug. 2019 and EP application 19192552.8 (reference: D19076EP), filed 20 Aug. 2019, which are hereby incorporated by reference.

TECHNOLOGY

The present disclosure relates generally to a method of encoding an audio signal into an encoded representation and a method of decoding an audio signal from the encoded representation.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

In high quality audio coding systems, it is common to have the largest part of the information describe detailed waveform properties of the signal. A minor part of information is used to describe more statistically defined features such as energies in frequency bands, or control data intended to shape a quantization noise according to known simultaneous masking properties of hearing (e.g., side information in a MDCT-based waveform coder that conveys the quantizer step size and range information necessary to correctly dequantize the data that represents the waveform in the decoder). These high quality audio coding systems however require comparatively large amounts of data for coding audio content, i.e., have comparatively low coding efficiency.

There is a need for audio coding methods and apparatus that can code audio data with improved coding efficiency.

SUMMARY

The present disclosure provides a method of encoding an audio signal, a method of decoding an audio signal, an encoder, a decoder, a computer program, and a computer-readable storage medium.

In accordance with a first aspect of the disclosure there is provided a method of encoding an audio signal. The encoding may be performed for each of a plurality of sequential portions (e.g., groups of samples, segments, frames) of the audio signal. The portions may be overlapping with each other in some implementations. An encoded representation may be generated for each such portion. The method may include generating a plurality of subband audio signals based on the audio signal. Generating the plurality of subband audio signals based on the audio signal may involve spectral decomposition of the audio signal, which may be performed by a filterbank of bandpass filters (BPFs). A frequency resolution of the filterbank may be related to a frequency resolution of the human auditory system. The BPFs may be complex-valued BPFs, for example. Alternatively, generating the plurality of subband audio signals based on the audio signal may involve spectrally and/or temporally flattening the audio signal, optionally windowing the flattened audio signal by a window function, and spectrally decomposing the resulting signal into the plurality of subband audio signals. The method may further include determining a spectral envelope of the audio signal. The method may further include, for each subband audio signal, determining autocorrelation information for the subband audio signal based on an autocorrelation function (ACF) of the subband audio signal. The method may yet further include generating an encoded representation of the audio signal, the encoded representation comprising a representation of the spectral envelope of the audio signal and a representation of the autocorrelation information for the plurality of subband audio signals. The encoded representation may relate to a portion of a bitstream, for example. In some implementations, the encoded representation may further comprise waveform information relating to a waveform of the audio signal and/or one or more waveforms of subband audio signals. The method may further include outputting the encoded representation.

Configured as described above, the proposed method provides an encoded representation of the audio signal that has a very high coding efficiency (i.e., requires very low bitrates for coding audio), but that at the same time includes appropriate information for achieving very good tonal quality after reconstruction. This is done by providing, in addition to the spectral envelope, also the autocorrelation information for the plurality of subbands of the audio signal. Notably, two values per subband, one lag value and one autocorrelation value, have proven sufficient for achieving high tonal quality.

In some embodiments, the autocorrelation information for a given subband audio signal may include a lag value for the respective subband audio signal and/or an autocorrelation value for the respective subband audio signal. Preferably, the autocorrelation information may include both the lag value for the respective subband audio signal and the autocorrelation value for the respective subband audio signal. Therein, the lag value may correspond to a delay value (e.g., abscissa) for which the autocorrelation function attains a local maximum, and the autocorrelation value may correspond to said local maximum (e.g., ordinate).

In some embodiments, the spectral envelope may be determined at a first update rate and the autocorrelation information for the plurality of subband audio signals may be determined at a second update rate. In this case, the first and second update rates may be different from each other. The update rates may also be referred to as sampling rates. In one such embodiment, the first update rate may be higher than the second update rate. Yet further, different update rates may apply to different subbands, i.e., the update rates for autocorrelation information for different subband audio signals may be different from each other.

By reducing the update rate of the autocorrelation information compared to that of the spectral envelope, the coding efficiency of the proposed method can be further improved without affecting tonal quality of the reconstructed audio signal.

In some embodiments, generating the plurality of subband audio signals may include applying spectral and/or temporal flattening to the audio signal. Generating the plurality of subband audio signals may further include windowing the flattened audio signal by a window function. Generating the plurality of subband audio signals may yet further include spectrally decomposing the windowed flattened audio signal into the plurality of subband audio signals. In this case, spectrally and/or temporally flattening the audio signal may involve generating a perceptually weighted LPC residual of the audio signal, for example.

In some embodiments, generating the plurality of subband audio signals may include spectrally decomposing the audio signal. Then, determining the autocorrelation function for a given subband audio signal may include determining a subband envelope of the subband audio signal. Determining the autocorrelation function may further include envelope-flattening the subband audio signal based on the subband envelope. The subband envelope may be determined by taking the magnitude values of the windowed subband audio signal. Determining the autocorrelation function may further include windowing the envelope-flattened subband audio signal by a window function. Determining the autocorrelation function may yet further include determining (e.g., calculating) the autocorrelation function of the envelope-flattened windowed subband audio signal. The autocorrelation function may be determined for the real-valued (envelope-flattened windowed) subband signal.

Another aspect of the disclosure relates to a method of decoding an audio signal from an encoded representation of the audio signal. The encoded representation may include a representation of a spectral envelope of the audio signal and a representation of autocorrelation information for each of a plurality of subband audio signals of (or generated from) the audio signal. The autocorrelation information for a given subband audio signal may be based on an autocorrelation function of the subband audio signal. The method may include receiving the encoded representation of the audio signal. The method may further include extracting the spectral envelope and the (multiple pieces of) autocorrelation information from the encoded representation of the audio signal. The method may yet further include determining a reconstructed audio signal based on the spectral envelope and the autocorrelation information. The reconstructed audio signal may be determined such that the autocorrelation function of each of a plurality of subband audio signals of (or generated from) the reconstructed audio signal would satisfy a condition derived from the autocorrelation information for the corresponding subband audio signal of (or generated from) the audio signal. For example, the reconstructed audio signal may be determined such that for each subband audio signal of the reconstructed audio signal, the value of the autocorrelation function of the subband audio signal of (or generated from) the reconstructed audio signal at the lag value (e.g., delay value) indicated by the autocorrelation information for the corresponding subband audio signal of (or generated from) the audio signal substantially matches the autocorrelation value indicated by the autocorrelation information for the corresponding subband audio signal of the audio signal. This may imply that the decoder can determine the autocorrelation function of the subband audio signals in the same manner as done by the encoder. This may involve any, some, or all, of flattening, windowing, and normalizing. In some implementations, the reconstructed audio signal may be determined such that the autocorrelation information for each of the plurality of subband signals of (or generated from) the reconstructed subband audio signal would substantially match the autocorrelation information for the corresponding subband audio signal of (or generated from) the audio signal. For example, the reconstructed audio signal may be determined such that for each subband audio signal of (or generated from) the reconstructed audio signal, the autocorrelation value and the lag value (e.g., delay value) of the autocorrelation function of the subband signal of the reconstructed audio signal substantially match the autocorrelation value and the lag value indicated by the autocorrelation information for the corresponding subband audio signal of (or generated from) the audio signal, for example. This may imply that the decoder can determine the autocorrelation information (i.e., lag value and autocorrelation value) for each subband signal of the reconstructed audio signal in the same manner as done by the encoder. Here, the term substantially matching may mean matching up to a predefined margin, for example. In those implementations in which the encoded representation includes waveform information, the reconstructed audio signal may be determined further based on the waveform information. The subband audio signals may be obtained for example by spectral decomposition of the applicable audio signal (i.e., of the original audio signal at the encoder side or of the reconstructed audio signal at the decoder side), or they may be obtained by flattening, windowing, and subsequently spectrally decomposing the applicable audio signal.

Thus, the decoder may be said to operate according to a synthesis by analysis approach, in that it attempts to find a reconstructed audio signal z that would satisfy at least one condition derived from the encoded representation h(x) of an encoded audio signal, or for which an encoded representation h(z) would substantially match the encoded representation h(x) of the original audio signal x, where h is the encoding map used by the encoder. In other words, the decoder may be said to find a decoding map d such that $h \circ d \circ h \simeq h$. As has been found, such synthesis by analysis approach yields results that are perceptually very close to the original audio signal if the encoded representation that the decoder attempts to reproduce includes spectral envelopes and autocorrelation information as defined in the present disclosure.

In some embodiments, the reconstructed audio signal may be determined in an iterative procedure that starts out from an initial candidate for the reconstructed audio signal and generates a respective intermediate reconstructed audio signal at each iteration. At each iteration, an update map may be applied to the intermediate reconstructed audio signal to obtain the intermediate reconstructed audio signal for the next iteration. The update map may be configured in such manner that the autocorrelation functions of the subband audio signals of (or generated from) the intermediate reconstruction of the audio signal come closer to satisfying the condition derived from the autocorrelation information for the corresponding subband audio signals of (or generated from) the audio signal and/or that a difference between measured signal powers of the subband audio signals of (or generated from) the reconstructed audio signal and signal powers for the corresponding subband audio signal of (or generated from) the audio signal that are indicated by the spectral envelope are reduced from one iteration to the next. If both the autocorrelation information and the spectral envelope are considered, an appropriate difference metric for the degree to which the conditions are satisfied and the differences between signal powers for the subband audio signals may be defined. In some implementations, the update map may be configured in such manner that a difference between an encoded representation of the intermediate reconstructed audio signal and the encoded representation of the audio signal becomes successively smaller from one iteration to the next. To this end, an appropriate difference metric for encoded representations (including spectral envelopes and/or autocorrelation information) may be defined and used. The autocorrelation function of the subband audio signals of (or generated from) the intermediate reconstructed audio signal may be determined in the same manner as done by the encoder for the subband audio signals of (or generated from) the audio signal. Likewise, the encoded representation of the intermediate reconstructed audio signal may be the encoded representation that would be obtained if the intermediate reconstructed audio signal were subjected to the same encoding technique that had led to the encoded representation of the audio signal.

Such iterative method allows for a simple, yet efficient implementation of the aforementioned synthesis by analysis approach.

In some embodiments, determining the reconstructed audio signal based on the spectral envelope and the autocorrelation information may include applying a machine learning based generative model that receives the spectral envelope of the audio signal and the autocorrelation information for each of the plurality of subband audio signals of the audio signal as an input and that generates and outputs the reconstructed audio signal. In those implementations in which the encoded representation includes waveform information, the machine learning based generative model may further receive the waveform information as an input. This implies that the machine learning based generative model may also be conditioned/trained using the waveform information.

Such machine-learning based method allows for a very efficient implementation of the aforementioned synthesis by analysis approach and can achieve reconstructed audio signals that are perceptually very close to the original audio signals.

Another aspect of the disclosure relates to an encoder for encoding an audio signal. The encoder may include a processor and a memory coupled to the processor, wherein the processor is adapted to perform the method steps of any one of the encoding methods described throughout this disclosure.

Another aspect of the disclosure relates to a decoder for decoding an audio signal from an encoded representation of the audio signal. The decoder may include a processor and a memory coupled to the processor, wherein the processor is adapted to perform the method steps of any one of the decoding methods described throughout this disclosure.

Another aspect relates to a computer program comprising instructions to cause a computer, when executing the instructions, to perform the method steps of any of the methods described throughout this disclosure.

Another aspect of the disclosure relates to a computer-readable storage medium storing the computer program according to the preceding aspect.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Introduction

High quality audio coding systems commonly require comparatively large amounts of data for coding audio content, i.e., have comparatively low coding efficiency. While the development of tools like noise fill and high frequency regeneration has shown that the waveform descriptive data can be partially replaced by a smaller set of control data, no high-quality audio codec relies primarily on perceptually relevant features. However, increased computational power and recent advances in the field of machine learning have increased the viability of decoding audio mainly from arbitrary encoder formats. The present disclosure proposes an example of such an encoder format.

Broadly speaking, the present disclosure proposes an encoding format based on auditory resolution inspired subband envelopes and additional information. The additional information includes a single autocorrelation value and single lag value per subband (and per update step). The envelopes can be computed at a first update rate and the additional information can be sampled at a second update rate. Decoding of the encoding format can proceed using a synthesis by analysis approach, which can be implemented by iterative or machine learning based techniques, for example.

Encoding

Figure 1:
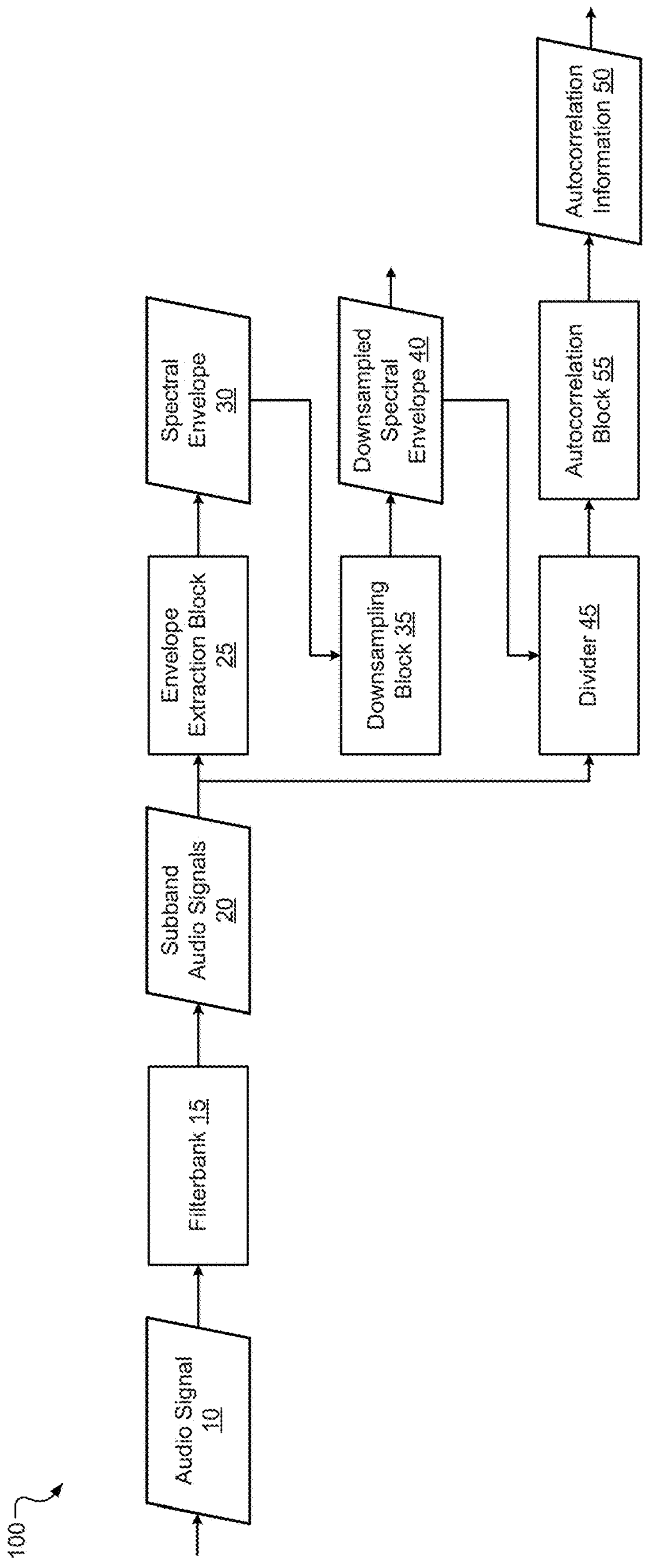
FIG. 1 is a block diagram schematically illustrating an example of an encoder according to embodiments of the disclosure.

The encoding format (encoded representation) proposed in this disclosure may be referred to as multi-lag format, since it provides one lag per subband (and update step). FIG. 1 is a block diagram schematically illustrating an example of an encoder 100 for generating an encoding format according to embodiments of the disclosure.

The encoder 100 receives a target sound 10, which corresponds to an audio signal to be encoded. The audio signal 10 may include a plurality of sequential or partially overlapping portions (e.g., groups of samples, segments, frames, etc.) that are processed by the encoder. The audio signal 10 is spectrally decomposed into a plurality of subband audio signals 20 in corresponding frequency subbands by means of a filterbank 15. The filterbank 15 may be a filterbank of bandpass filters (BPFs), which may be complex-valued BPFs, for example. For audio it is natural use a filterbank of BPFs with a frequency resolution related to the human auditory system.

A spectral envelope 30 of the audio signal 10 is extracted at envelope extraction block 25. For each subband, the power is measured in predetermined time steps as a basic model of an auditory envelope or excitation pattern on the cochlea resulting from the input sound signal, to thereby determine the spectral envelope 30 of the audio signal 10. That is, the spectral envelope 30 may be determined based on the plurality of subband audio signals 20, for example by measuring (e.g., estimating, calculating) a respective signal power for each of the plurality of subband audio signals 20. However, the spectral envelope 30 may be determined by any appropriate alternative tool, such as a Linear Predictive Coding (LPC) description, for example. In particular, in some implementations the spectral envelope may be determined from the audio signal prior to spectral decomposition by the filterbank 15.

Optionally, the extracted spectral envelope 30 can be subjected to downsampling at downsampling block 35, and the downsampled spectral envelope 40 (or the spectral envelope 30) is output as part of the encoding format or encoded representation of (the applicable portion of) the audio signal 10.

Reconstructed signals reconstructed from spectral envelopes alone might still lack in tonal quality. To address this issue, the present disclosure proposes to include a single value (i.e., ordinate and abscissa) of the autocorrelation function of the (possibly envelope-flattened) signal per subband which leads to dramatically improved sound quality. To this end, the subband audio signals 20 are optionally flattened (envelope-flattened) at divider 45 and input to an autocorrelation block 55. The autocorrelation block 55 determines an autocorrelation function (ACF) of its input signal and outputs respective pieces of autocorrelation information 50 for each of the subband audio signals 20 (i.e., for each of the subbands) based on the ACF of respective subband audio signals 20. The autocorrelation information 50 for a given subband includes (e.g., consists of) representations 50 of a lag value T and an autocorrelation value ρ(T). That is, for each subband, one value of the lag T and the corresponding (possibly normalized) autocorrelation value (ACF value) ρ(T) is output (e.g., transmitted) as the autocorrelation information 50, which is part of the encoded representation. Therein, the lag value T corresponds to a delay value for which the ACF attains a local maximum, and the autocorrelation value ρ(T) corresponds to said local maximum.

In other words, the autocorrelation information for a given subband may comprise a delay value (i.e., abscissa) and an autocorrelation value and (i.e., ordinate) of the local maximum of the ACF.

The encoded representation of the audio signal thus includes the spectral envelope of the audio signal and the autocorrelation information for each of the subbands. The autocorrelation information for a given subband includes representations of the lag value T and the autocorrelation value ρ(T). The encoded representation corresponds to the output of the encoder. In some implementations, the encoded representation may additionally comprise waveform information relating to a waveform of the audio signal and/or one or more waveforms of subband audio signals.

By the above procedure, an encoding function (or encoding map) h is defined that maps the input audio signal to the encoded representation thereof.

As noted above, the spectral envelope and the autocorrelation information for the subband audio signals may be determined and output at different update rates (sample rates). For example, the spectral envelope can be determined at a first update rate and the autocorrelation information for the plurality of subband audio signals can be determined at a second update rate that is different from the first update rate. The representation of the spectral envelope and the representations of the autocorrelation information (for all the subbands) may be written into a bitstream at respective update rates (sample rates). In this case, the encoded representation may relate to a portion of a bitstream that is output by the encoder. In this regard, it is to be noted that for each instant in time, a current spectral envelope and current set of pieces of autocorrelation information (one for each subband) is defined by the bitstream and can be taken as the encoded representation. Alternatively, the representation of the spectral envelope and the representations of the autocorrelation information (for all the subbands) may be updated in respective output units of the encoder at respective update rates. In this case, each output unit (e.g., encoded frame) of the encoder corresponds to an instance of the encoded representation. Representations of the spectral envelope and the autocorrelation information may be identical among series of successive output units, depending on respective update rates.

Preferably, the first update rate is higher than the second update rate. In one example, the first update rate $R_1$ may be $R_1$=1/(2.5 ms) and the second update rate $R_2$ may be $R_2$=1/(20 ms), so that an updated representation of the spectral envelope is output every 2.5 ms, whereas updated representations of the autocorrelation information are output every 20 ms. In terms of portions (e.g., frames) of the audio signal, the spectral envelope may be determined every n-th portion (e.g., every portion), whereas the autocorrelation information may be determined every m-th portion, with m>n.

The encoded representation(s) may be output as a sequence of frames of a certain frame length. Among other factors, the frame length may depend on the first and/or second update rates. Considering a frame that has a length of a first period $L_1$ (e.g., 2.5 ms) corresponding to the first update rate $R_1$ (e.g., 1/(2.5 ms)) via $L_1=1/R_1$, this frame would include one representation of a spectral envelope and a representation of one set of pieces of autocorrelation information (one piece per subband audio signal). For first and second update rates of 1/(2.5 ms) and 1/(20 ms), respectively, the autocorrelation information would be the same for eight consecutive frames of encoded representations. In general, the autocorrelation information would be the same for $R_1/R_2$ consecutive frames of encoded representations, assuming that $R_1$ and $R_2$ are appropriately chosen to have an integer ratio. Considering on the other hand a frame that has a length of a second period $L_2$ (e.g., 20 ms) corresponding to the second update rate $R_2$ (e.g., 1/(20 ms)) via $L_2$=1; $R_2$, this frame would include a representation of one set of pieces of autocorrelation information and $R_1/R_2$ (e.g., eight) representations of spectral envelopes.

In some implementations, different update rates may even be applied to different subbands, i.e., the autocorrelation information for different subband audio signals may be generated and output at different update rates.

Figure 2:
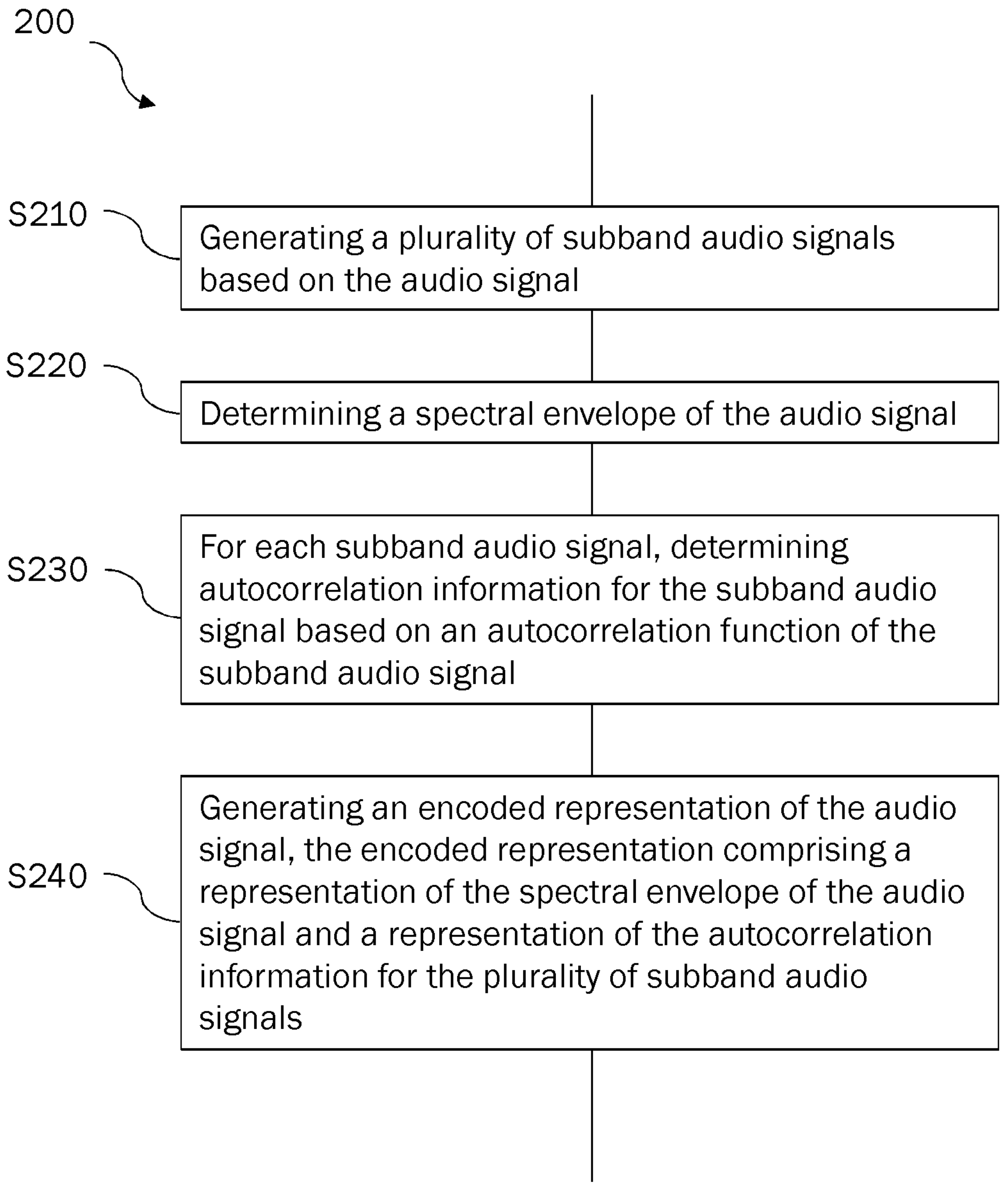
FIG. 2 is a flowchart illustrating an example of an encoding method according to embodiments of the disclosure, FIG. 3 schematically illustrates examples of waveforms that may be present in the framework of the encoding method of FIG. 2.

FIG. 2 is a flowchart illustrating an example of an encoding method 200 according to embodiments of the disclosure. The method, which may be implemented by encoder 100 described above, receives an audio signal as input.

At step S210, a plurality of subband audio signals is generated based on the audio signal. This may involve spectrally decomposing the audio signal, in which case this step may be performed in accordance with the operation of the filterbank 15 described above. Alternatively, this may involve spectrally and/or temporally flattening the audio signal, optionally windowing the flattened audio signal by a window function, and spectrally decomposing the resulting signal into the plurality of subband audio signals.

At step S220, a spectral envelope of the audio signal is determined (e.g., calculated). This step may be performed in accordance with the operation of the envelope extraction block 25 described above.

At step S230, for each subband audio signal, autocorrelation information is determined for the subband audio signal based on an ACF of the subband audio signal. This step may be performed in accordance with the operation of the autocorrelation block 55 described above.

At step S240, an encoded representation of the audio signal is generated. The encoded representation comprises a representation of the spectral envelope of the audio signal and a representation of the autocorrelation information for each of the plurality of subband audio signals.

Next, examples of implementation details of steps of method 200 will be described.

For example, as noted above, generating the plurality of subband audio signals may comprise (or amount to) spectrally decomposing the audio signal, for example by means of a filterbank. In this case, determining the autocorrelation function for a given subband audio signal may comprise determining a subband envelope of the subband audio signal. The subband envelope may be determined by taking the magnitude values of the subband audio signal. The ACF itself may be calculated for the real-valued (envelope-flattened windowed) subband signal.

Assuming that the subband filter responses are complex valued with Fourier transforms essentially supported on positive frequencies, the subband signals become complex valued. Then, a subband envelope can be determined by taking the magnitude of the complex valued subband signal. This subband envelope has as many samples as the subband signal and can still be somewhat oscillatory. Optionally, the subband envelope can be downsampled, for example by computing a triangular window weighted sum of squares of the envelope in segments of certain length (e.g., length 5 ms, rise 2.5 ms, fall 2.5 ms) for each shift of half the certain length (e.g., 2.5 ms) along the signal, and then taking the square root of this sequence to get the downsampled subband envelope. This may be said to correspond to a "rms envelope" definition. The triangular window can be normalized such that a constant envelope of value one gives a sequence of ones. Other ways to determine the subband envelope are feasible as well, such as half wave rectification followed by low pass filtering in the case of a real valued subband signal. In any case, the subband envelopes can be said to carry information on the energy in in the subband signals (at the selected update rate).

Then, the subband audio signal may be envelope-flattened based on the subband envelope. For example, to get to the fine structure signal (carrier) from which the ACF data is computed, a new full sample rate envelope signal may be created by linear interpolation of the downsampled values and dividing the original (complex-valued) subband signals by this linearly interpolated envelope.

The envelope-flattened subband audio signal may then be windowed by an appropriate window function. Finally, the ACF of the windowed envelope-flattened subband audio signal is determined (e.g., calculated). In some implementations, determining the ACF for a given subband audio signal may further comprise normalizing the ACF of the windowed envelope-flattened subband audio signal by an autocorrelation function of the window function.

Figure 3:
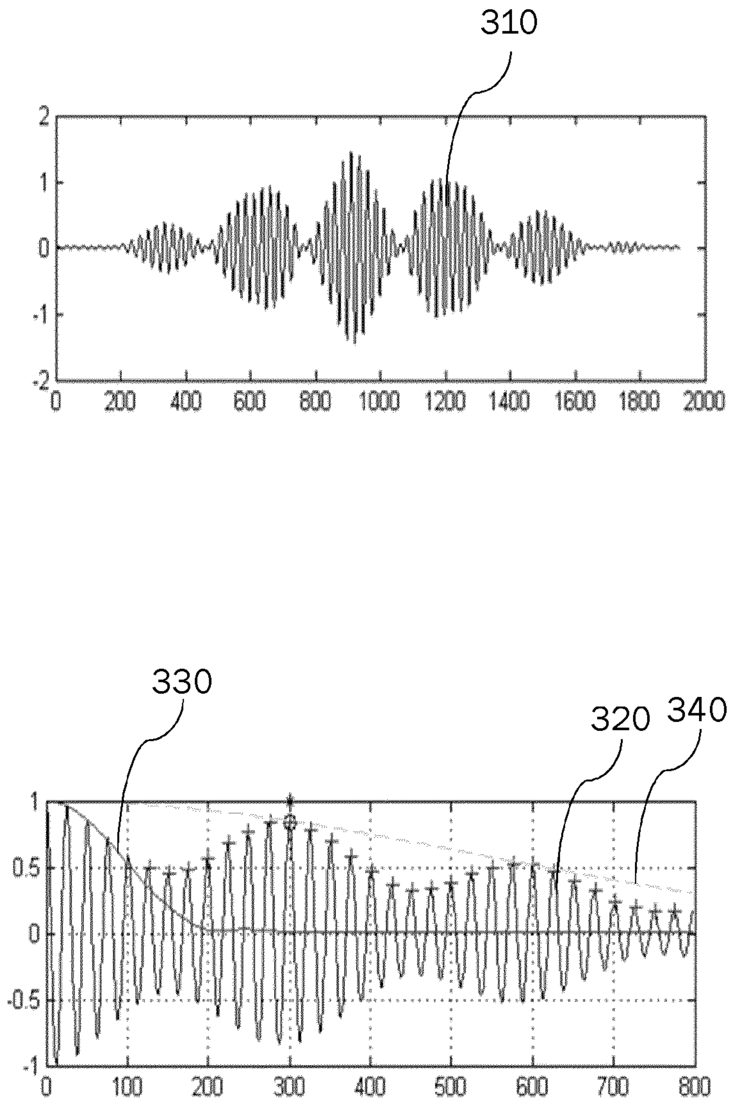

In FIG. 3, curve 310 in the upper panel indicates the real value of the windowed envelope-flattened subband signal that is used for calculating the ACF. The solid curve 320 in the lower panel indicates the real values of the complex ACF.

The main idea now is to find the largest local maximum of the subband signal's ACF among those local maxima that lie above the ACF of the absolute value of the impulse response of the (complex valued) subband filter (i.e., the corresponding BPF of the filterbank). For a subband signal's ACF that is complex-valued, the real values of the ACF may be considered at this point. Finding the largest local maximum above the ACF of the absolute value of the impulse response may be necessary to avoid picking lags related to the center frequency of the subband rather than the properties of the input signal. As a last adjustment, the maximum value may be divided by that of the ACF of the employed window function for the subband ACF window (assuming that the subband signal's ACF itself has been normalized, e.g., such that the autocorrelation value for zero delay is normalized to one). This leads to better usage of the interval between 0 and 1 where $\rho(T)=1$ is maximum tonality.

Accordingly, determining the autocorrelation information for a given subband audio signal based on the ACF of the subband audio signal may further comprise comparing the ACF of the subband audio signal to an ACF of an absolute value of an impulse response of a respective bandpass filter associated with the subband audio signal. The ACF of an absolute value of an impulse response of a respective bandpass filter associated with the subband audio signal is indicated by solid curve 330 in the lower panel of FIG. 3. The autocorrelation information is then determined based on a highest local maximum of the ACF of the subband signal above the ACF of the absolute value of the impulse response of the respective bandpass filter associated with the subband audio signal. In the lower panel of FIG. 3, the local maxima of the ACF are indicated by crosses, and the selected highest local maximum of the ACF of the subband signal above the ACF of the absolute value of the impulse response of the respective bandpass is indicated by a circle. Optionally, the selected local maximum of the ACF may be normalized by the value of the ACF of the ACF of the window function (assuming that the ACF itself has been normalized, e.g., such that the autocorrelation value for zero delay is normalized to one). The normalized selected highest local maximum of the ACF is indicated by an asterisk in the lower panel of FIG. 3, and dashed curve 340 indicates the ACF of the window function.

The autocorrelation information determined at this stage may comprise an autocorrelation value and a delay value (i.e., ordinate and abscissa) of the selected (normalized) highest local maximum of the ACF of the subband audio signal.

A similar encoding format could be defined in the framework of an LPC based vocoder. Also in this case, the autocorrelation information is extracted from a subband signal which is influenced by at least some degree of spectral and/or temporal flattening. Unlike the aforementioned example, this is done by creating a (perceptually weighted) LPC residual, windowing it, and decomposing it into subbands to obtain the plurality of subband audio signals. This is followed by calculation of the ACF and extraction of the lag value and autocorrelation value for each subband audio signal.

For example, generating the plurality of subband audio signals may comprise applying spectral and/or temporal flattening to the audio signal (e.g., by generating a perceptually weighted LPC residual from the audio signal, using an LPC filter). This may be followed by windowing the flattened audio signal by a window function, and spectrally decomposing the windowed flattened audio signal into the plurality of subband audio signals. As noted above, the outcome of temporal and/or spectral flattening may correspond to the perceptually weighted LPC residual, which is then subjected to windowing and spectral decomposition into subbands. The perceptually weighted LPC residual may be a pink LPC residual, for example.

Decoding

The present disclosure relates to audio decoding that is based on a synthesis by analysis approach. On the most abstract level, it is assumed that an encoding map h from signals to a perceptually motivated domain is given, such that an original audio signal x is represented by y=h(x). In the best case, a simple distortion measure like least squares in the perceptual domain is a good prediction of the subjective difference as measured by a population of listeners.

One problem left is to design a decoder q that maps from (a coded and decoded version of) y to an audio signal z=d(y). To this end, the concept of synthesis by analysis can be used that involves "finding a waveform that comes closest to generating the given picture". The target is that z and x should sound alike, so the decoder should solve the inverse problem h(z)=y=h(x). In terms of composition of maps, d should approximate a left inverse of h, meaning that $h \circ d \circ h \approx h$. This inverse problem is often ill-posed in the sense that it has many solutions. An opportunity to realize significant saving in bitrate lies in the observation that a large number of different waveforms will create the same sound impression.

Figure 4:
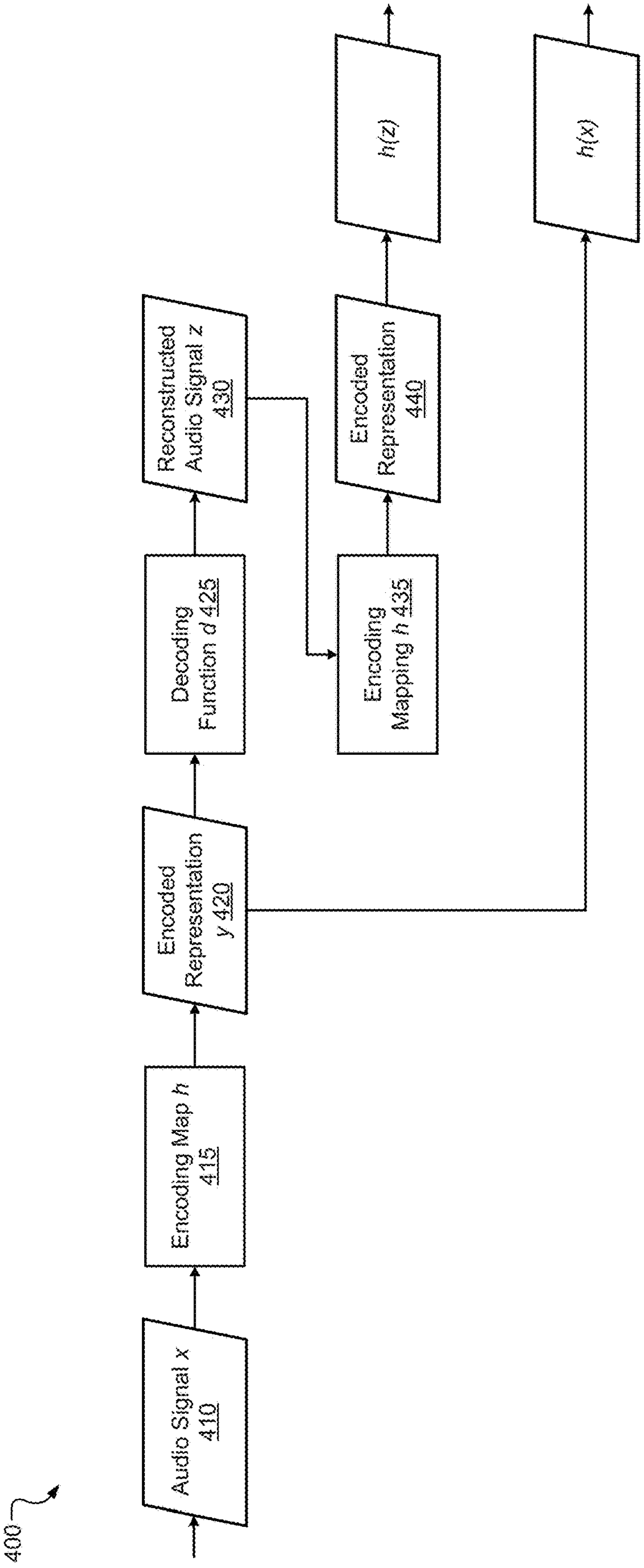
FIG. 4 is a block diagram schematically illustrating an example of a synthesis by analysis approach for determining a decoding function.

FIG. 4 is a block diagram schematically illustrating an example of a synthesis by analysis approach for determining a decoding function (or decoding map) d, given an encoding function (or encoding map) h. An original audio signal x, 410, is subjected to the encoding map h, 415, yielding an encoded representation y, 420, where y=h(x). The encoded representation y may be defined in a perceptual domain. The aim is to find a decoding function (decoding mapping) d, 425, that maps the encoded representation y to a reconstructed audio signal z, 430, which has the property that applying the encoding mapping h, 435, to the reconstructed audio signal z would yield an encoded representation h(z), 440, that substantially matches the encoded representation y=h(x). Here, "substantially matching" may mean "matching up to a predefined margin," for example. In other words, given an encoding map h the aim is to find a decoding map d such that $h \circ d \circ h \approx h$.

Figure 5:
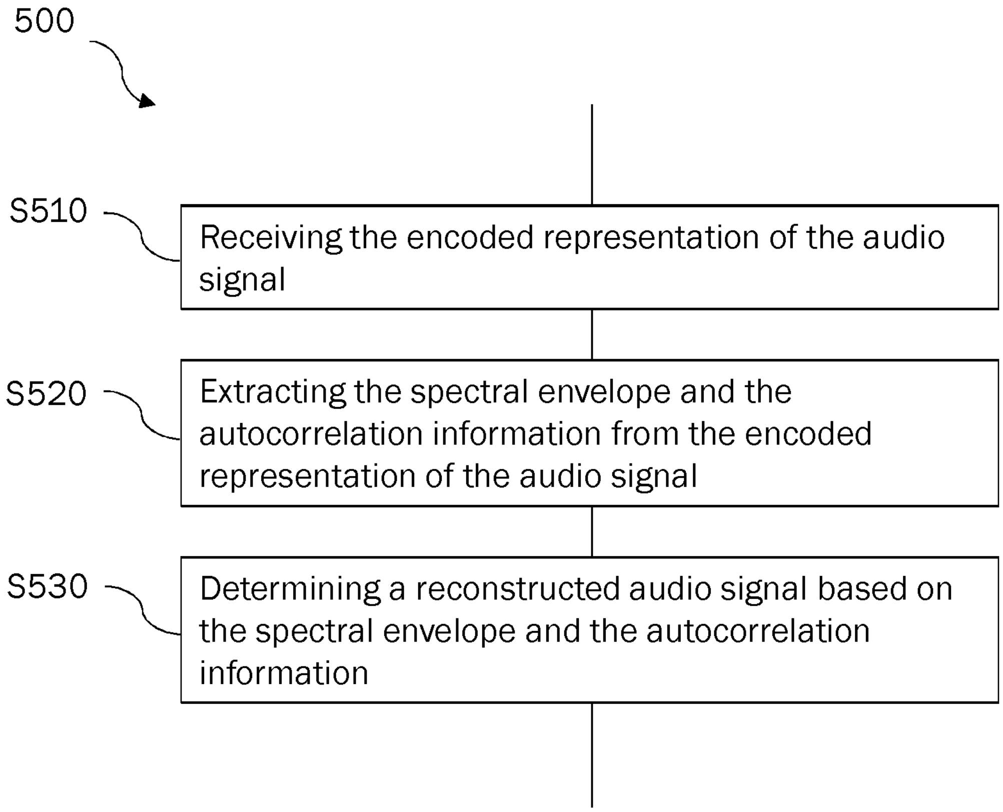
FIG. 5 is a flowchart illustrating an example of a decoding method according to embodiments of the disclosure.

FIG. 5 is a flowchart illustrating an example of a decoding method 500 in line with the synthesis by analysis approach, according to embodiments of the disclosure. Method 500 is a method of decoding an audio signal from an encoded representation of the (original) audio signal. The encoded representation is assumed to include a representation of a spectral envelope of the original audio signal and a representation of autocorrelation information for each of a plurality of subband audio signals of the original audio signal. The autocorrelation information for a given subband audio signal is based on an ACF of the subband audio signal.

At step S510, the encoded representation of the audio signal is received.

At step S520, the spectral envelope and the autocorrelation information are extracted from the encoded representation of the audio signal.

At step S530, a reconstructed audio signal is determined based on the spectral envelope and the autocorrelation information. Therein, the reconstructed audio signal is determined such that the autocorrelation function of each of a plurality of subband signals of the reconstructed subband audio signal would (substantially) satisfy a condition derived from the autocorrelation information for the corresponding subband audio signals of the audio signal. This condition may be, for example, that for each subband audio signal of the reconstructed audio signal, the value of the ACF of the subband audio signal of the reconstructed audio signal at the lag value (e.g., delay value) indicated by the autocorrelation information for the corresponding subband audio signal of the audio signal substantially matches the autocorrelation value indicated by the autocorrelation information for the corresponding subband audio signal of the audio signal. This may imply that the decoder can determine the ACF of the subband audio signals in the same manner as done by the encoder. This may involve any, some, or all of flattening, windowing, and normalizing. In one implementation, the reconstructed audio signal may be determined such that for each subband audio signal of the reconstructed audio signal, the autocorrelation value and the lag value (e.g., delay value) of the ACF of the subband signal of the reconstructed audio signal substantially match the autocorrelation value and the lag value indicated by the autocorrelation information for the corresponding subband audio signal of the original audio signal. This may imply that the decoder can determine the autocorrelation information for each subband signal of the reconstructed audio signal, in the same manner as done by the encoder. In those implementations in which the encoded representation also includes waveform information, the reconstructed audio signal may be determined further based on the waveform information. The subband audio signals of the reconstructed audio signal may be generated in the same manner as done by the encoder. For example, this may involve spectral decomposition, or a sequence of flattening, windowing, and spectral decomposition.

Preferably, the determination of the reconstructed audio signal at step S530 also takes into account the spectral envelope of the original audio signal. Then, the reconstructed audio signal may be further determined such that for each subband audio signal of the reconstructed subband audio signal, a measured (e.g., estimated or calculated) signal power of the subband audio signal of the reconstructed audio signal substantially matches a signal power for the corresponding subband audio signal of the original audio signal that is indicated by the spectral envelope.

As can be seen from the above, the proposed method 500 can be said to be inspired by the synthesis by analysis approach, in that it attempts to find a reconstructed audio signal z that (substantially) satisfies at least one condition derived from the encoded representation y=h(x) of an original audio signal x, where h is the encoding map used by the encoder. In some implementations, the proposed method can even be said to operate according to the synthesis by analysis approach, in that it attempts to find a reconstructed audio signal z for which an encoded representation h(z) would substantially match the encoded representation y=h(x) of the original audio signal x. In other words, the decoding method may be said to find a decoding map d such that $h \circ d \circ h \approx h$. Two non-limiting implementation examples of method 500 will be described next.

IMPLEMENTATION EXAMPLE 1

Parametric Synthesis or Per Signal Iterations

The inverse problem h(z)=y can be solved by iterative methods given an update map $z_n = f(z_{n-1}, y)$ which modifies $z_{n-1}$ such that $h(z_n)$ is closer toy than $h(z_{n-1})$. The starting point of the iteration (i.e., an initial candidate for the reconstructed audio signal) can either be a random noise signal (e.g., white noise), or it may be determined based on the encoded representation of the audio signal (e.g., as a manually crafted first guess), for example. In the latter case, the initial candidate for the reconstructed audio signal may relate to an educated guess that is made based on the spectral envelope and/or the autocorrelation information for the plurality of subband audio signals. In those implementations in which the encoded representation includes waveform information, the educated guess may be made further based on the waveform information.

In more detail, the reconstructed audio signal in this implementation example is determined in an iterative procedure that starts out from an initial candidate for the reconstructed audio signal and generates a respective intermediate reconstructed audio signal at each iteration. At each iteration, an update map is applied to the intermediate reconstructed audio signal to obtain the intermediate reconstructed audio signal for the next iteration. The update map is chosen such that a difference between an encoded representation of the intermediate reconstructed audio signal and the encoded representation of the original audio signal becomes successively smaller from one iteration to the next. To this end, an appropriate difference metric for encoded representations (e.g., spectral envelope, autocorrelation information) may be defined and used for assessing the difference. The encoded representation of the intermediate reconstructed audio signal may be the encoded representation that would be obtained if the intermediate reconstructed audio signal were subjected to the same encoding scheme that had led to the encoded representation of the audio signal.

In case that the procedure seeks a reconstructed audio signal that satisfies at least one condition derived from the (multiple pieces of) autocorrelation information, the update map may be chosen such that the autocorrelation functions of the subband audio signals of the intermediate reconstruction of the audio signal come closer to satisfying respective conditions derived from the autocorrelation information for the corresponding subband audio signals of the audio signal and/or that a difference between measured signal powers of the subband audio signals of the reconstructed audio signal and signal powers for the corresponding subband audio signal of the audio signal that are indicated by the spectral envelope are reduced from one iteration to the next. If both the autocorrelation information and the spectral envelope are considered, an appropriate difference metric for the degree to which the conditions are satisfied and the difference between signal powers for the subband audio signals may be defined.

IMPLEMENTATION EXAMPLE 2

Machine Learning Based Generative Models

Another option enabled by modern machine learning methods is to train a machine learning based generative model (or generative model for short) for audio x conditioned on the data y. That is, given a large collection of examples of (x, y) where y=h (x), a parametric conditional distribution p(x|y) from y to x is trained. The decoding algorithm then may consist of sampling from the distribution z~p(x|y).

This option has been found to be particularly advantageous for the case where h(x) is a speech vocoder and p(x|y) is defined by the sequential generative model Sample Recurrent Neural Network (RNN). However, other generative models such as variational autoencoders or generative adversarial models are relevant for this task as well. Thus, without intended limitation, the machine learning based generative model can be one of a recurrent neural network, a variational autoencoder, or a generative adversarial model (e.g., a Generative Adversarial Network (GAN)).

In this implementation example, determining the reconstructed audio signal based on the spectral envelope and the autocorrelation information comprises applying a machine learning based generative model that receives the spectral envelope of the audio signal and the autocorrelation information for each of the plurality of subband audio signals of the audio signal as an input and that generates and outputs the reconstructed audio signal. In those implementations in which the encoded representation also includes waveform information, the machine learning based generative model may further receive the waveform information as an input.

As described above, the machine learning based generative model may comprise a parametric conditional distribution p(x|y) that relates encoded representations y of audio signals and corresponding audio signals x to respective probabilities p. Then, determining the reconstructed audio signal may comprise sampling from the parametric conditional distribution p(x|y) for the encoded representation of the audio signal.

In a training phase, prior to decoding, the machine learning based generative model may be conditioned/trained on a data set of a plurality of audio signals and corresponding encoded representations of the audio signals. If the encoded representation also includes waveform information, the machine learning based generative model may also be conditioned/trained using the waveform information.

Figure 6:
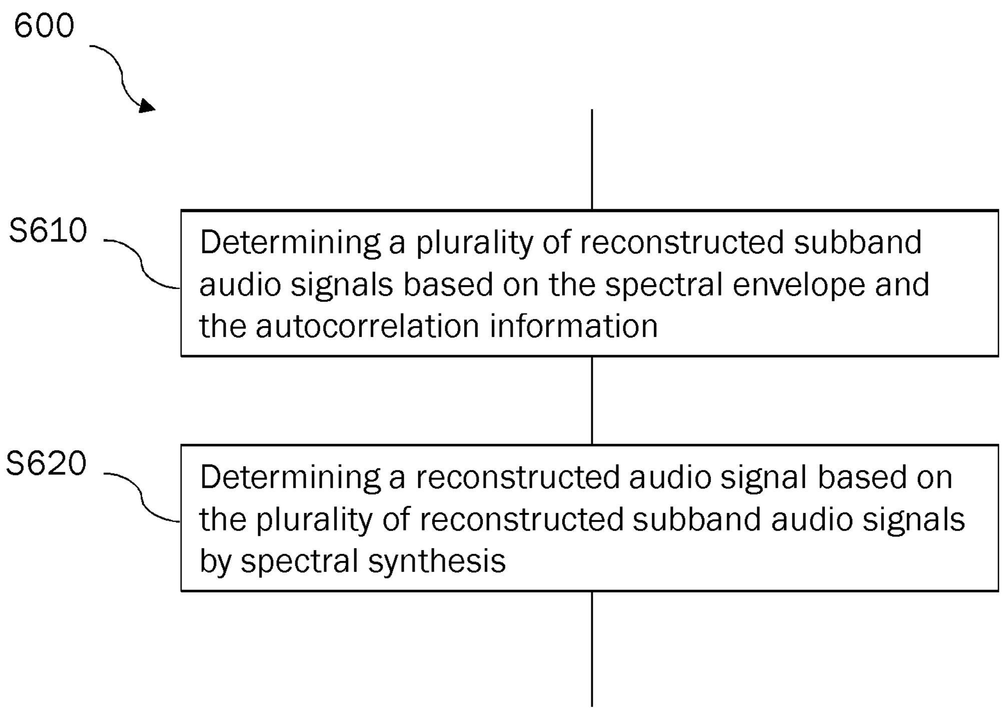
FIG. 6 is a flowchart illustrating an example of a step in the decoding method of FIG. 5.

FIG. 6 is a flowchart illustrating an example implementation 600 for step S530 in the decoding method 500 of FIG. 5. In particular, implementation 600 relates to a per subband implementation of step S530.

At step 610, a plurality of reconstructed subband audio signals are determined based on the spectral envelope and the autocorrelation information. Therein, the plurality of reconstructed subband audio signals are determined such that for each reconstructed subband audio signal, the autocorrelation function of the reconstructed subband audio signal would satisfy a condition derived from the autocorrelation information for the corresponding subband audio signal of the audio signal. In some implementations, the plurality of reconstructed subband audio signals are determined such that for each reconstructed subband audio signal, autocorrelation information for the reconstructed subband audio signal would substantially match the autocorrelation information for the corresponding subband audio signal.

Preferably, the determination of the plurality of reconstructed subband audio signals at step S610 also takes into account the spectral envelope of the original audio signal. Then, the plurality of reconstructed subband audio signals are further determined such that for each reconstructed subband audio signal, a measured (e.g., estimated, calculated) signal power of the reconstructed subband audio signal substantially matches a signal power for the corresponding subband audio signal that is indicated by the spectral envelope.

At step S620, a reconstructed audio signal is determined based on the plurality of reconstructed subband audio signals by spectral synthesis.

The Implementation Examples 1 and 2 described above may also be applied to the per subband implementation of step S530. For Implementation Example 1, each reconstructed subband audio signal may be determined in an iterative procedure that starts out from an initial candidate for the reconstructed subband audio signal and that generates a respective intermediate reconstructed subband audio signal in each iteration. At each iteration, an update map may be applied to the intermediate reconstructed subband audio signal to obtain the intermediate reconstructed subband audio signal for the next iteration, in such manner that a difference between the autocorrelation information for the intermediate reconstructed subband audio signal and the autocorrelation information for the corresponding subband audio signal becomes successively smaller from one iteration to the next, or that the reconstructed subband audio signals satisfy respective conditions derived from the autocorrelation information for respective corresponding subband audio signals of the audio signal to a better degree.

Again, also the spectral envelope may be taken into account at this point. That is, the update map may be such that a (joint) difference between respective signal powers of subband audio signals and between respective items of autocorrelation information becomes successively smaller. This may imply a definition of an appropriate difference metric for assessing the (joint) difference. Other than that, the same explanations as given above for the Implementation Example 1 may apply to this case.

Applying Implementation Example 2 to the per subband implementation of step S530, determining the plurality of reconstructed subband audio signals based on the spectral envelope and the autocorrelation information may comprise applying a machine learning based generative model that receives the spectral envelope of the audio signal and the autocorrelation information for each of a plurality of subband audio signals of the audio signal as an input and that generates and outputs the plurality of reconstructed subband audio signals. Other than that, the same explanations as given above for the Implementation Example 2 may apply to this case.

Figure 7:
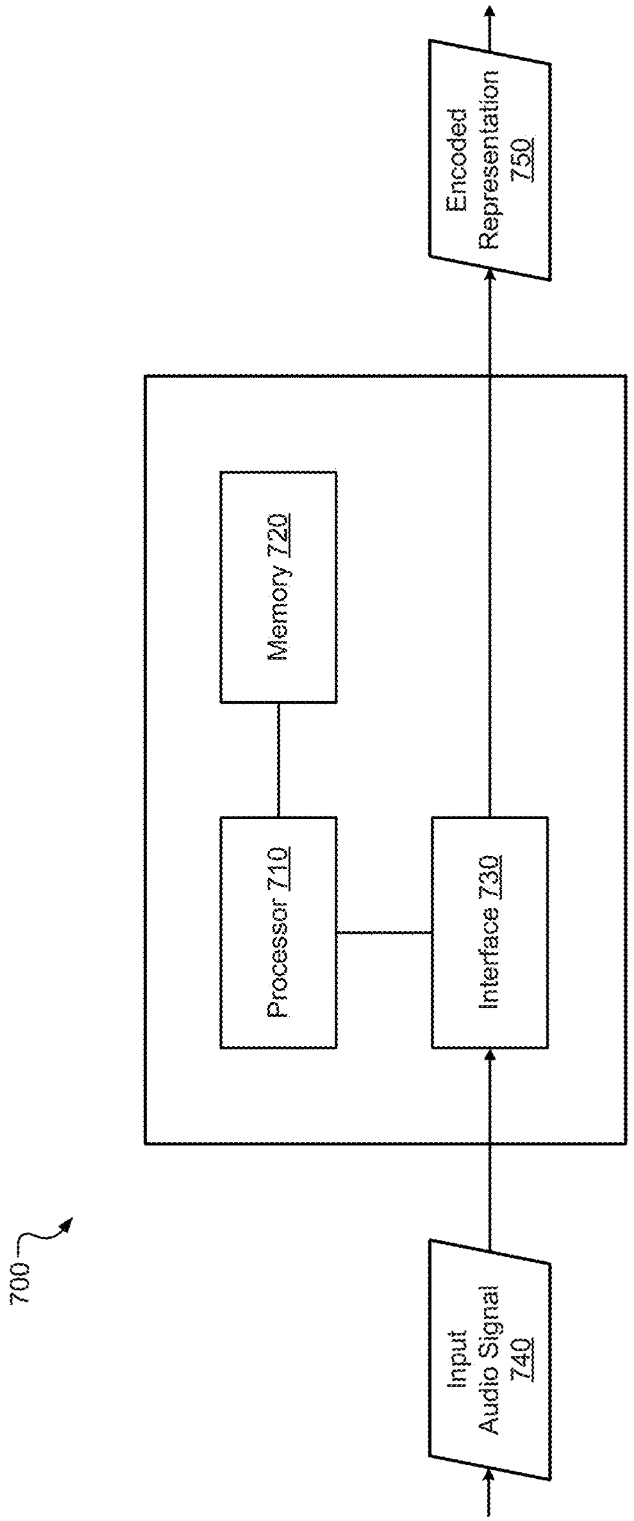
FIG. 7 is a block diagram schematically illustrating another example of an encoder according to embodiments of the disclosure.

The present disclosure further relates to encoders for encoding an audio signal that are capable of and adapted to perform the encoding methods described throughout the disclosure. An example of such encoder 700 is schematically illustrated in FIG. 7 in block diagram form. The encoder 700 comprises a processor 710 and a memory 720 coupled to the processor 710. The processor 710 is adapted to perform the method steps of any one of the encoding methods described throughout the disclosure. To this end, the memory 720 may include respective instructions for the processor 710 to execute. The encoder 700 may further comprise an interface 730 for receiving an input audio signal 740 that is to be encoded and/or for outputting an encoded representation 750 of the audio signal.

Figure 8:
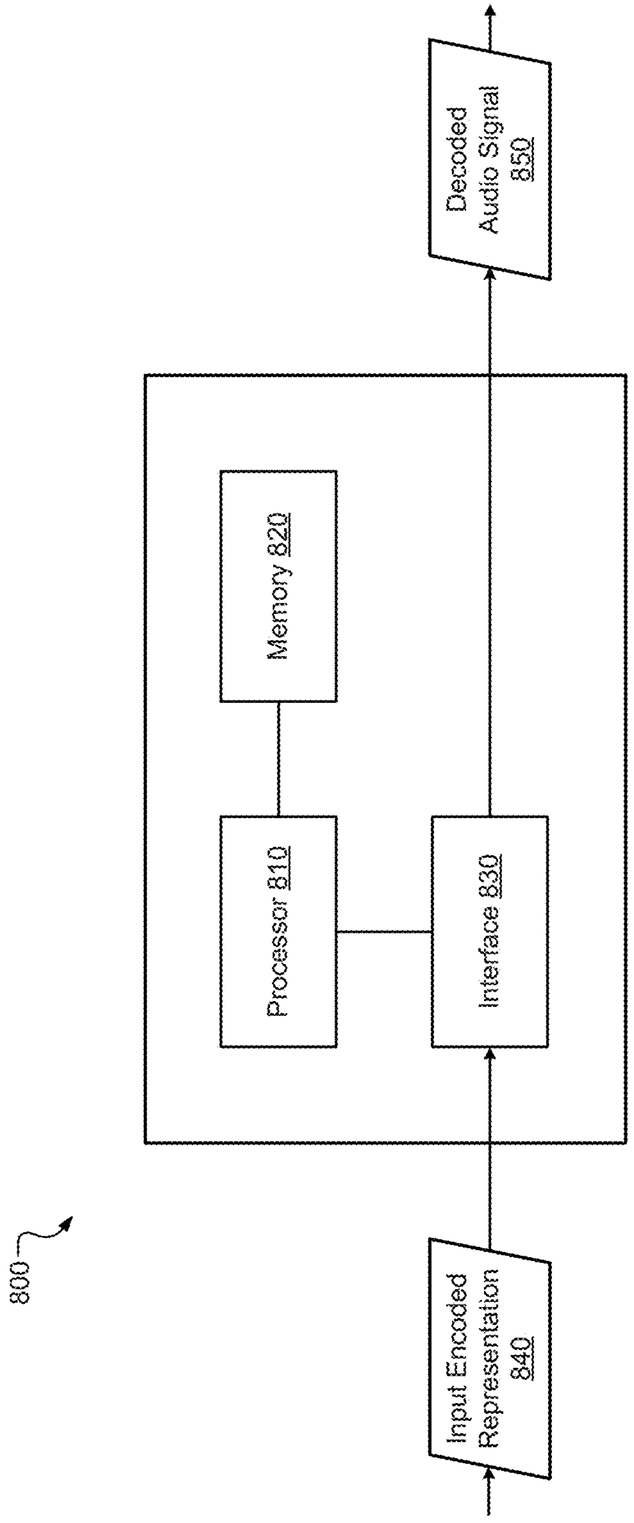
FIG. 8 is a block diagram schematically illustrating an example of a decoder according to embodiments of the disclosure.

The present disclosure further relates to decoders for decoding an audio signal from an encoded representation of the audio signal that are capable of and adapted to perform the decoding methods described throughout the disclosure. An example of such decoder 800 is schematically illustrated in FIG. 8 in block diagram form. The decoder 800 comprises a processor 810 and a memory 820 coupled to the processor 810. The processor 810 is adapted to perform the method steps of any one of the decoding methods described throughout the disclosure. To this end, the memory 820 may include respective instructions for the processor 810 to execute. The decoder 800 may further comprise an interface 830 for receiving an input encoded representation 840 of an audio signal that is to be decoded and/or for outputting the decoded (i.e., reconstructed) audio signal 850.

The present disclosure further relates to computer programs comprising instructions to cause a computer, when executing the instructions, to perform the encoding or decoding methods described throughout the disclosure.

Finally, the present disclosure also relates to computer-readable storage media storing computer programs as described above.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects and implementations of the present disclosure may be appreciated from the enumerated example embodiments (EEEs) listed below.

EEE1. A method of encoding an audio signal, the method comprising:

generating a plurality of subband audio signals based on the audio signal;

determining a spectral envelope of the audio signal;

for each subband audio signal, determining autocorrelation information for the subband audio signal based on an autocorrelation function of the subband audio signal; and generating an encoded representation of the audio signal, the encoded representation comprising a representation of the spectral envelope of the audio signal and a representation of the autocorrelation information for the plurality of subband audio signals.

EEE 2. The method according to EEE 1, wherein the spectral envelope is determined based on the plurality of subband audio signals.

EEE 3. The method according to EEE 1 or 2, wherein the autocorrelation information for a given subband audio signal comprises a lag value for the respective subband audio signal and/or an autocorrelation value for the respective subband audio signal.

EEE 4. The method according to the preceding EEE, wherein the lag value corresponds to a delay value for which the autocorrelation function attains a local maximum, and wherein the autocorrelation value corresponds to said local maximum.

EEE 5. The method according to any of the preceding EEEs, wherein the spectral envelope is determined at a first update rate and the autocorrelation information for the plurality of subband audio signals is determined at a second update rate; and wherein the first and second update rates are different from each other.

EEE 6. The method according to the preceding EEE, wherein the first update rate is higher than the second update rate.

EEE 7. The method according to any one of the preceding EEEs, wherein generating the plurality of subband audio signals comprises:

applying spectral and/or temporal flattening to the audio signal;

windowing the flattened audio signal; and spectrally decomposing the windowed flattened audio signal into the plurality of subband audio signals.

EEE 8. The method according to any one of EEEs 1 to 6, wherein generating the plurality of subband audio signals comprises spectrally decomposing the audio signal; and wherein determining the autocorrelation function for a given subband audio signal comprises: determining a subband envelope of the subband audio signal;

envelope-flattening the subband audio signal based on the subband envelope;

windowing the envelope-flattened subband audio signal by a window function; and determining the autocorrelation function of the windowed envelope-flattened subband audio signal.

EEE 9. The method according to EEE 7 or 8, wherein determining the autocorrelation function for a given subband audio signal further comprises:

normalizing the autocorrelation function of the windowed envelope-flattened subband audio signal by an autocorrelation function of the window function.

EEE 10. The method according to any one of the preceding EEEs, wherein determining the autocorrelation information for a given subband audio signal based on the autocorrelation function of the subband audio signal comprises:

comparing the autocorrelation function of the subband audio signal to an autocorrelation function of an absolute value of an impulse response of a respective bandpass filter associated with the subband audio signal; and determining the autocorrelation information based on a highest local maximum of the autocorrelation function of the subband signal above the autocorrelation function of the absolute value of the impulse response of the respective bandpass filter associated with the subband audio signal.

EEE 11. The method according to any one of the preceding EEEs, wherein determining the spectral envelope comprises measuring a signal power for each of the plurality of subband audio signals.

EEE 12. A method of decoding an audio signal from an encoded representation of the audio signal, the encoded representation including a representation of a spectral envelope of the audio signal and a representation of autocorrelation information for each of a plurality of subband audio signals generated from the audio signal, wherein the autocorrelation information for a given subband audio signal is based on an autocorrelation function of the subband audio signal, the method comprising:

receiving the encoded representation of the audio signal;

extracting the spectral envelope and the autocorrelation information from the encoded representation of the audio signal; and determining a reconstructed audio signal based on the spectral envelope and the autocorrelation information, wherein the reconstructed audio signal is determined such that the autocorrelation function for each of a plurality of subband signals generated from the reconstructed audio signal would satisfy a condition derived from the autocorrelation information for the corresponding subband audio signals generated from the audio signal.

EEE 13. The method according to the preceding EEE, wherein the reconstructed audio signal is further determined such that for each subband audio signal of the reconstructed audio signal, a measured signal power of the subband audio signal of the reconstructed audio signal substantially matches a signal power for the corresponding subband audio signal of the audio signal that is indicated by the spectral envelope.

EEE 14. The method according to EEE 12 or 13, wherein the reconstructed audio signal is determined in an iterative procedure that starts out from an initial candidate for the reconstructed audio signal and generates a respective intermediate reconstructed audio signal at each iteration; and wherein at each iteration, an update map is applied to the intermediate reconstructed audio signal to obtain the intermediate reconstructed audio signal for the next iteration, in such manner that a difference between an encoded representation of the intermediate reconstructed audio signal and the encoded representation of the audio signal becomes successively smaller from one iteration to another.

EEE 15. The method according to EEE 14, wherein the initial candidate for the reconstructed audio signal is determined based on the encoded representation of the audio signal.

EEE 16. The method according to EEE 14, wherein the initial candidate for the reconstructed audio signal is white noise.

EEE 17. The method according to EEE 12 or 13, wherein determining the reconstructed audio signal based on the spectral envelope and the autocorrelation information comprises applying a machine learning based generative model that receives the spectral envelope of the audio signal and the autocorrelation information for each of the plurality of subband audio signals of the audio signal as an input and that generates and outputs the reconstructed audio signal.

EEE 18. The method according to the preceding EEE, wherein the machine learning based generative model comprises a parametric conditional distribution that relates encoded representations of audio signals and corresponding audio signals to respective probabilities; and wherein determining the reconstructed audio signal comprises sampling from the parametric conditional distribution for the encoded representation of the audio signal.

EEE 19. The method according to EEE 17 or 18, further comprising, in a training phase, training the machine learning based generative model on a data set of a plurality of audio signals and corresponding encoded representations of the audio signals.

EEE 20. The method according to any one of EEEs 17 to 19, wherein the machine learning based generative model is one of a recurrent neural network, a variational autoencoder, or a generative adversarial model.

EEE 21. The method according to EEE 12, wherein determining the reconstructed audio signal based on the spectral envelope and the autocorrelation information comprises:

determining a plurality of reconstructed subband audio signals based on the spectral envelope and the autocorrelation information; and determining a reconstructed audio signal based on the plurality of reconstructed subband audio signals by spectral synthesis, wherein the plurality of reconstructed subband audio signals are determined such that for each reconstructed subband audio signal, the autocorrelation function of the reconstructed subband audio signal would satisfy a condition derived from the autocorrelation information for the corresponding subband audio signal.

EEE 22. The method according to the preceding EEE, wherein the plurality of reconstructed subband audio signals are further determined such that for each reconstructed subband audio signal, a measured signal power of the reconstructed subband audio signal substantially matches a signal power for the corresponding subband audio signal that is indicated by the spectral envelope.

EEE 23. The method according to EEE 21 or 22, wherein each reconstructed subband audio signal is determined in an iterative procedure that starts out from an initial candidate for the reconstructed subband audio signal and generates a respective intermediate reconstructed subband audio signal in each iteration; and wherein at each iteration, an update map is applied to the intermediate reconstructed subband audio signal to obtain the intermediate reconstructed subband audio signal for the next iteration, in such manner that a difference between the autocorrelation information for the intermediate reconstructed subband audio signal and the autocorrelation information for the corresponding subband audio signal becomes successively smaller from one iteration to another.

EEE 24. The method according to EEE 21 or 22, wherein determining the plurality of reconstructed subband audio signals based on the spectral envelope and the autocorrelation information comprises applying a machine learning based generative model that receives the spectral envelope of the audio signal and the autocorrelation information for each of a plurality of subband audio signals of the audio signal as an input and that generates and outputs the plurality of reconstructed subband audio signals.

EEE 25. An encoder for encoding an audio signal, the encoder comprising a processor and a memory coupled to the processor, wherein the processor is adapted to perform the method steps of any one of EEEs 1 to 11.

EEE 26. A decoder for decoding an audio signal from an encoded representation of the audio signal, comprising a processor and a memory coupled to the processor, wherein the processor is adapted to perform the method steps of any one of EEEs 12 to 24.

EEE 27. A computer program comprising instructions to cause a computer, when executing the instructions, to perform the method according to any one of EEEs 1 to 24.

EEE 28. A computer-readable storage medium storing the computer program according to the preceding EEE.

The invention claimed is:

1. A method of encoding an audio signal, the method comprising:

generating a plurality of subband audio signals based on the audio signal;

determining a spectral envelope of the audio signal;

for each subband audio signal, determining autocorrelation information for the subband audio signal based on an autocorrelation function of the subband audio signal, wherein the autocorrelation information comprises an autocorrelation value for the subband audio signal;

encoding into an encoded representation of the audio signal the spectral envelope of the audio signal and the autocorrelation information for the plurality of subband audio, signals; and generating a bitstream based on the encoded representation;

wherein the autocorrelation information for a given subband audio signal further comprises a lag value for the given subband audio signal;

wherein the spectral envelope is determined at a first update rate and the autocorrelation information for the plurality of subband audio signals is determined at a second update rate;

wherein the first update rate is higher than the second update rate.

2. The method according to claim 1, wherein the lag value corresponds to a delay value for which the autocorrelation function attains a local maximum, and wherein the autocorrelation value corresponds to said local maximum.

3. The method according to claim 1, wherein generating the plurality of subband audio signals comprises:

applying spectral and/or temporal flattening to the audio signal;

windowing the flattened audio signal; and spectrally decomposing the windowed flattened audio signal into the plurality of subband audio signals.

4. The method according to claim 1, wherein generating the plurality of subband audio signals comprises spectrally decomposing the audio signal; and wherein determining the autocorrelation function for a given subband audio signal comprises:

determining a subband envelope of the subband audio signal;

envelope-flattening the subband audio signal based on the subband envelope;

windowing the envelope-flattened subband audio signal by a window function; and determining the autocorrelation function of the windowed envelope-flattened subband audio signal.

5. The method according to claim 3, wherein determining the autocorrelation function for a given subband audio signal further comprises:

normalizing the autocorrelation function of the windowed envelope-flattened subband audio signal by an autocorrelation function of the window function.

6. The method according to claim 1, wherein determining the autocorrelation information for a given subband audio signal based on the autocorrelation function of the subband audio signal comprises:

comparing the autocorrelation function of the subband audio signal to an autocorrelation function of an absolute value of an impulse response of a respective bandpass filter associated with the subband audio signal; and determining the autocorrelation information based on a highest local maximum of the autocorrelation function of the subband signal above the autocorrelation function of the absolute value of the impulse response of the respective bandpass filter associated with the subband audio signal.

7. A method of decoding an audio signal from an encoded representation of the audio signal, the encoded representation including a spectral envelope of the audio signal and autocorrelation information for each of a plurality of subband audio signals generated from the audio signal, wherein the autocorrelation information for a given subband audio signal is based on an autocorrelation function of the subband audio signal, wherein the spectral envelope is determined at a first update rate and the autocorrelation information for the plurality of subband audio signals is determined at a second update rate, and wherein the first update rate is higher than the second update rate, the method comprising:

receiving the encoded representation of the audio signal;

extracting the spectral envelope and the autocorrelation information from the encoded representation of the audio signal;

determining a reconstructed audio signal by spectral synthesis based on the spectral envelope and the autocorrelation information; and outputting the reconstructed audio signal;

wherein the autocorrelation information for a given subband audio signal comprises an autocorrelation value for the subband audio signal and a lag value for the given subband audio signal.

8. The method according to claim 7, wherein the reconstructed audio signal is determined such that the autocorrelation function for each of a plurality of subband signals generated from the reconstructed audio signal satisfies a condition derived from the autocorrelation information for the corresponding subband audio signals generated from the audio signal.

9. The method according to claim 7, wherein the reconstructed audio signal is determined such that autocorrelation information for each of the plurality of subband signals of the reconstructed audio signal matches, up to a predefined margin, the autocorrelation information for the corresponding subband audio signal of the audio signal.

10. The method according to claim 7, wherein the reconstructed audio signal is determined such that for each subband audio signal of the reconstructed audio signal, the value of the autocorrelation function of the subband audio signal of the reconstructed audio signal at the lag value indicated by the autocorrelation information for the corresponding subband audio signal of the audio signal matches, up to a predefined margin, the autocorrelation value indicated by the autocorrelation information for the corresponding subband audio signal of the audio signal.

11. The method according to claim 7, wherein the reconstructed audio signal is further determined such that for each subband audio signal of the reconstructed audio signal, a measured signal power of the subband audio signal of the reconstructed audio signal matches, up to a predefined margin, a signal power for the corresponding subband audio signal of the audio signal that is indicated by the spectral envelope.

12. The method according to claim 7, wherein the reconstructed audio signal is determined in an iterative procedure that starts out from an initial candidate for the reconstructed audio signal and generates a respective intermediate reconstructed audio signal at each iteration; and wherein at each iteration, an update map is applied to the intermediate reconstructed audio signal to obtain the intermediate reconstructed audio signal for the next iteration, in such manner that a difference between an encoded representation of the intermediate reconstructed audio signal and the encoded representation of the audio signal becomes successively smaller from one iteration to another.

13. The method according to claim 7, wherein determining the reconstructed audio signal based on the spectral envelope and the autocorrelation information comprises applying a machine learning based generative model that receives the spectral envelope of the audio signal and the autocorrelation information for each of the plurality of subband audio signals of the audio signal as an input and that generates and outputs the reconstructed audio signal.

14. The method according to claim 13, wherein the machine learning based generative model comprises a parametric conditional distribution that relates encoded representations of audio signals and corresponding audio signals to respective probabilities; and wherein determining the reconstructed audio signal comprises sampling from the parametric conditional distribution for the encoded representation of the audio signal.

15. The method according to claim 13, wherein the machine learning based generative model is one of a recurrent neural network, a variational autoencoder, or a generative adversarial model.

16. The method according to claim 8, wherein determining the reconstructed audio signal based on the spectral envelope and the autocorrelation information comprises:

determining a plurality of reconstructed subband audio signals based on the spectral envelope and the autocorrelation information; and determining a reconstructed audio signal based on the plurality of reconstructed subband audio signals by spectral synthesis, wherein the plurality of reconstructed subband audio signals are determined such that for each reconstructed subband audio signal, the autocorrelation function of the reconstructed subband audio signal satisfies a condition derived from the autocorrelation information for the corresponding subband audio signal of the audio signal.

17. The method according to claim 16, wherein the plurality of reconstructed subband audio signals are determined such that autocorrelation information for each reconstructed subband audio signal matches, up to a predefined margin, the autocorrelation information for the corresponding subband audio signal of the audio signal.

18. The method according to claim 16, wherein the plurality of reconstructed subband audio signals are determined such that for each reconstructed subband audio signal, the value of the autocorrelation function of the reconstructed subband audio signal at the lag value indicated by the autocorrelation information for the corresponding subband audio signal of the audio signal matches, up to a predefined margin, an autocorrelation value indicated by the autocorrelation information for the corresponding subband audio signal of the audio signal.

* * * * *